(12) United States Patent
Feng et al.

(10) Patent No.: US 8,842,161 B2
(45) Date of Patent: Sep. 23, 2014

(54) VIDEOCONFERENCING SYSTEM HAVING ADJUNCT CAMERA FOR AUTO-FRAMING AND TRACKING

(75) Inventors: Jinwei Feng, Woburn, MA (US); Yibo Liu, Reading, MA (US); Xiangdong Wang, North Billerica, MA (US); Peter L. Chu, Lexington, MA (US)

(73) Assignee: Polycom, Inc., San Jose, CA (US)

( * ) Notice: Subject to any disclaimer, the term of this patent is extended or adjusted under 35 U.S.C. 154(b) by 181 days.

(21) Appl. No.: 13/589,380

(22) Filed: Aug. 20, 2012

(65) Prior Publication Data

US 2014/0049595 A1 Feb. 20, 2014

Related U.S. Application Data

(63) Continuation-in-part of application No. 12/782,137, filed on May 18, 2010, now Pat. No. 8,395,653.

(51) Int. Cl.
*H04N 7/14* (2006.01)

(52) U.S. Cl.
USPC .................................. 348/14.12; 348/14.08

(58) Field of Classification Search
USPC .................. 348/14.01, 14.08, 14.12, 14.16
See application file for complete search history.

(56) References Cited

U.S. PATENT DOCUMENTS

| | | | |
|---|---|---|---|
| 5,778,082 A | 7/1998 | Chu et al. | |
| 5,844,599 A | 12/1998 | Hildin | |
| 6,005,610 A | 12/1999 | Pingali | |
| 6,496,607 B1 | 12/2002 | Krishnamurthy et al. | |
| 6,577,333 B2 | 6/2003 | Tai et al. | |
| 6,593,956 B1 | 7/2003 | Potts et al. | |
| 6,731,334 B1 | 5/2004 | Maeng et al. | |
| 6,766,035 B1 | 7/2004 | Gutta | |
| 6,798,441 B2 | 9/2004 | Hartman et al. | |
| 6,922,206 B2 | 7/2005 | Chu et al. | |
| 6,980,485 B2 | 12/2005 | McCaskill | |
| 7,039,199 B2 | 5/2006 | Rui | |
| 7,349,008 B2 | 3/2008 | Rui et al. | |
| 7,806,604 B2 | 10/2010 | Bazakos et al. | |
| 2002/0101505 A1 | 8/2002 | Gutta et al. | |
| 2002/0113862 A1 | 8/2002 | Center et al. | |
| 2002/0140804 A1 | 10/2002 | Colmenarez et al. | |
| 2004/0037436 A1 | 2/2004 | Rui | |

(Continued)

OTHER PUBLICATIONS

First Office Action in co-pending U.S. Appl. No. 12/782,137, mailed Jun. 29, 2011.

(Continued)

*Primary Examiner* — Olisa Anwah
(74) *Attorney, Agent, or Firm* — Wong, Cabello, Lutsch, Rutherford & Brucculeri, LLP

(57) ABSTRACT

A videoconference apparatus and method coordinates a stationary view obtained with a stationary camera to an adjustable view obtained with an adjustable camera. The stationary camera can be a web camera, while the adjustable camera can be a pan-tilt-zoom camera. As the stationary camera obtains video, faces of participants are detected, and a boundary in the view is determined to contain the detected faces. Absence and presences of motion associated with the detected face is used to verify whether a face is reliable. To then capture and output video of the participants for the videoconference, the view of the adjustable camera is adjusted to a framed view based on the determined boundary. In the end, active video captured in the framed view with the adjustable camera can be sent to a far-end for the videoconference.

24 Claims, 10 Drawing Sheets

(56) References Cited

U.S. PATENT DOCUMENTS

| | | |
|---|---|---|
| 2005/0243168 A1 | 11/2005 | Cutler |
| 2006/0012671 A1 | 1/2006 | Nimri et al. |
| 2006/0209194 A1 | 9/2006 | Liu et al. |
| 2006/0222354 A1 | 10/2006 | Mori et al. |
| 2007/0046775 A1 | 3/2007 | Ferren et al. |
| 2008/0095401 A1 | 4/2008 | Saleh et al. |
| 2008/0218582 A1* | 9/2008 | Buckler .................. 348/14.08 |
| 2008/0297587 A1 | 12/2008 | Kurtz et al. |
| 2010/0085415 A1 | 4/2010 | Rahman |
| 2010/0123770 A1 | 5/2010 | Friel et al. |
| 2011/0285807 A1 | 11/2011 | Feng |
| 2011/0285808 A1 | 11/2011 | Feng et al. |
| 2011/0285809 A1 | 11/2011 | Feng et al. |

OTHER PUBLICATIONS

Reply to First Office Action (mailed Jun. 29, 2011) in co-pending U.S. Appl. No. 12/782,137, filed Oct. 31, 2011.

Second Office Action in co-pending U.S. Appl. No. 12/782,137, mailed Jan. 26, 2012.

Reply to Second Office Action (mailed Jan. 26, 2012) in co-pending U.S. Appl. No. 12/782,137, filed Jun. 26, 2012.

First Office Action in co-pending U.S. Appl. No. 12/782,155, mailed Aug. 4, 2011.

Reply to First Office Action (mailed Aug. 4, 2011) in co-pending U.S. Appl. No. 12/782,155.

First Office Action in co-pending U.S. Appl. No. 12/782,173, mailed Mar. 12, 2012.

Reply to First Office Action (mailed Mar. 12, 2012) in co-pending U.S. Appl. No. 12/782,173.

Klechenov, "Real-time Mosaic for Multi-Camera Videoconferencing," Singapore-MIT Alliance, National University of Singapore, Manuscript received Nov. 1, 2002.

"Polycom (R) HDX 7000 Series: Features and Benefits," (c) 2008 Polycom, Inc.

"Polycom (R) HDX 8000 Series: Features and Benefits," (c) 2007 Polycom, Inc.

Hasan, "Speaker Indentification Using MEL Frequency Cepstral Coefficients," 3rd International Conference on Electrical & Computer Engineering, ICECE 2004, Dec. 28-30, 2004, Dhaka, Bangladesh, pp. 565-568.

1 PC Network Inc., Video Conferencing Equipment and Services, "Sony PCSG70N and PCSG70S—4 Mbps High-End Videoconferencing Systems (with or without camera)," obtained from hilp://www.1pcn.com/sony/pcs-g70/index.htm, generated on Apr. 5, 2010, 8 pages.

* cited by examiner

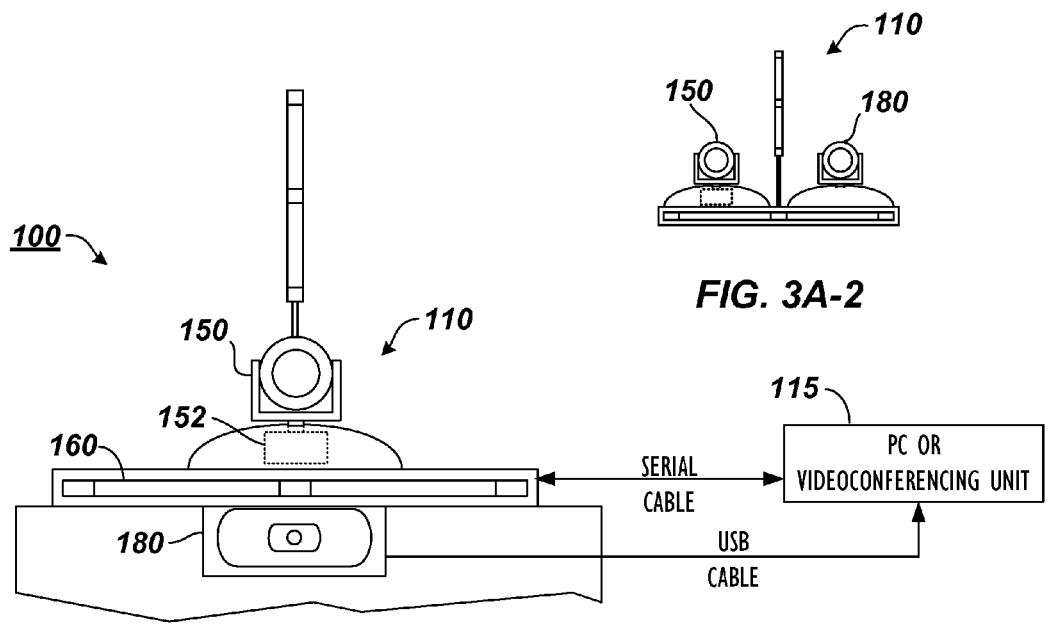
FIG. 3A-2
FIG. 3A-1
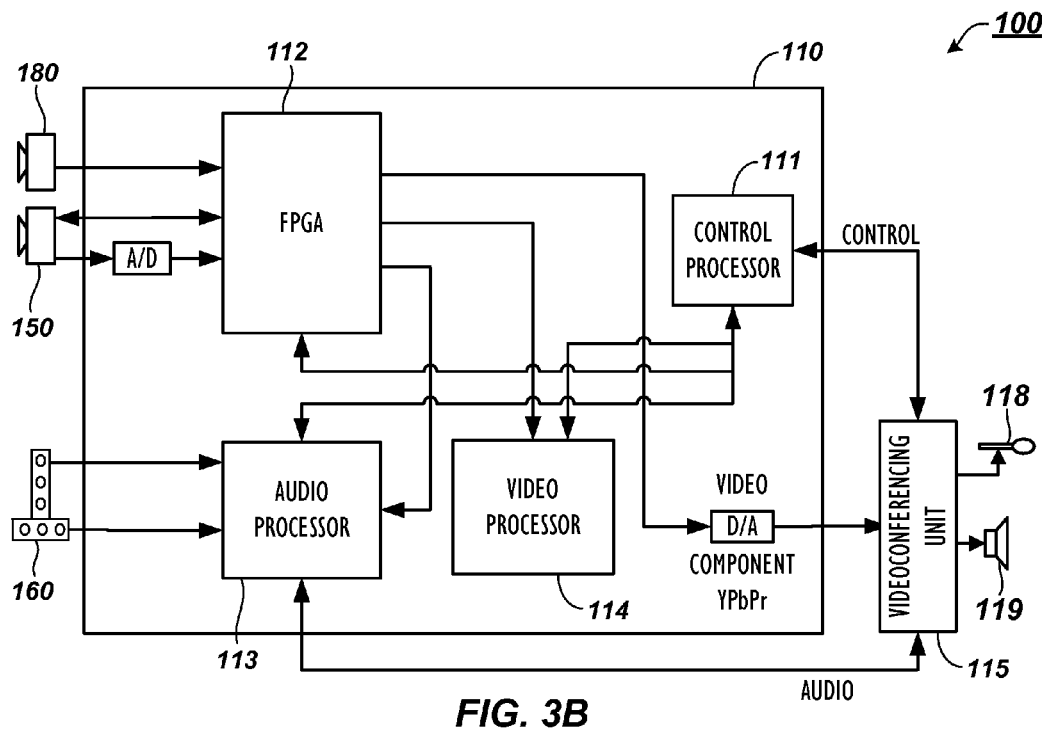
FIG. 3B

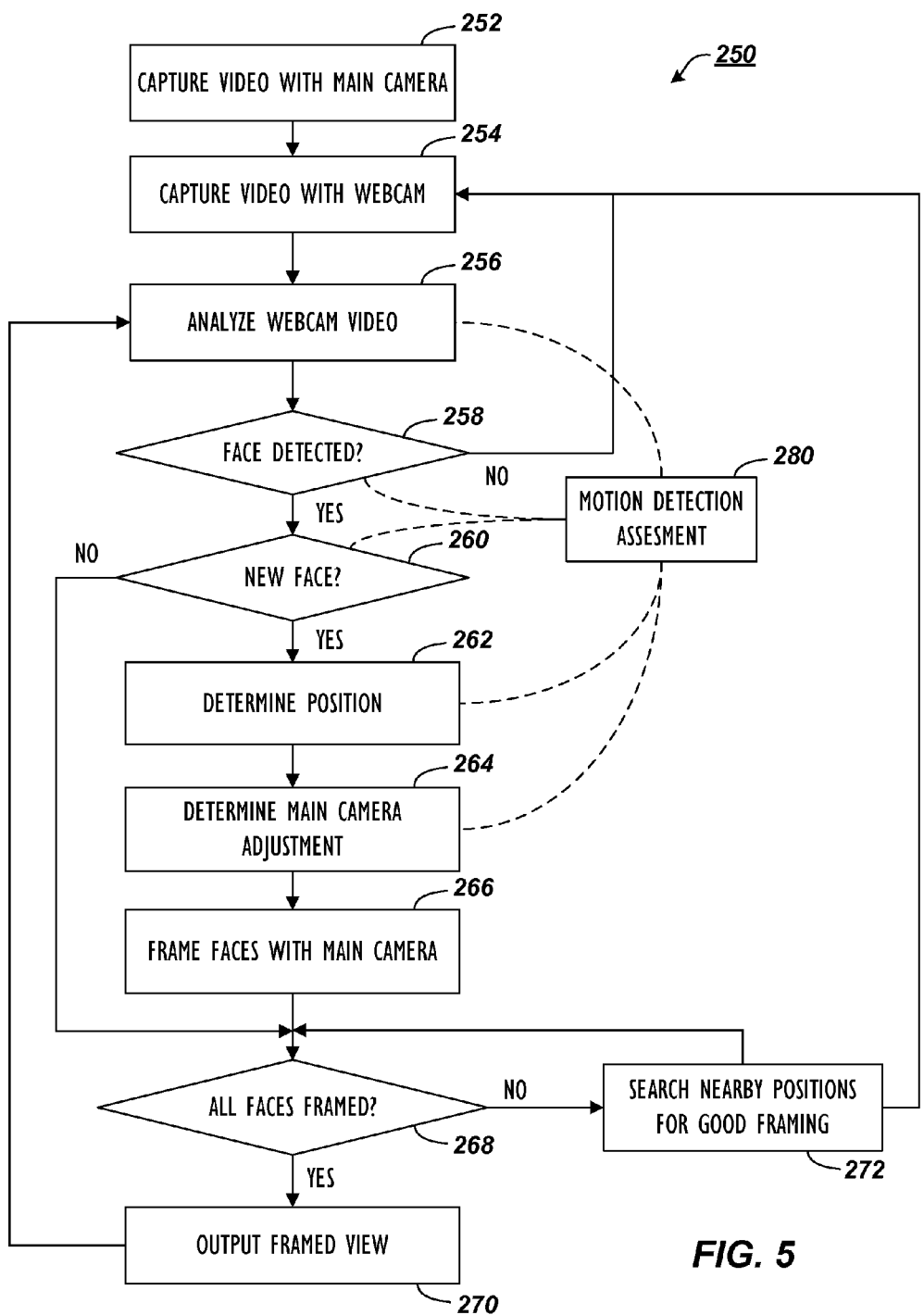

VIDEOCONFERENCING SYSTEM HAVING ADJUNCT CAMERA FOR AUTO-FRAMING AND TRACKING

CROSS-REFERENCE TO RELATED APPLICATIONS

This is a continuation-in-part of U.S. application Ser. No. 12/782,137, filed 18-May-2010, which has been incorporated herein by reference in its entirety.

BACKGROUND OF THE DISCLOSURE

The camera for a videoconferencing system often has mechanical pan, tilt, and zoom control. Ideally, these controls should be continuously adjusted to achieve optimal video framing of the people in the room based on where they are seated and who is talking. Unfortunately, due to the difficulty of performing these adjustments, the camera may often be set to a fixed, wide-angle view of the entire room and may not be adjusted. If this is the case, far-end participants may lose much of the value from the video captured by the camera because the size of the near-end participants displayed at the far-end may be too small. In some cases, the far-end participants cannot see the facial expressions of the near-end participants and may have difficulty determining who is actually speaking. These problems give the videoconference an awkward feel and make it hard for the participants to have a productive meeting.

To deal with poor framing, participants may have to intervene and perform a series of manual operations to pan, tilt, and zoom the camera to capture a better view. As expected, manually directing the camera can be cubersome even when a remote control is used. Sometime, participants just do not bother adjusting the camera's view and simply use the default wide view. Of course, when a participant does manually frame the camera's view, the procedure has to be repeated if participants change positions during the videoconference or use a different seating arrangement in a subsequent videoconference.

As an improvement, voice-tracking cameras having microphone arrays can help direct the camera during the videoconference toward participants who are speaking. Although the voice-tracking camera is very useful, it can still encounter some problems. When a speaker turns away from the microphones, for example, the voice-tracking camera may lose track of the speaker.

Additionally, a very reverberant environment can cause the voice-tracking camera to direct at a reflection point rather than at an actual sound source of a person speaking. For example, typical reflections can be produced when the speaker turns away from the camera or when the speaker sits at an end of a table. If the reflections are troublesome enough, the voice-tracking camera may be guided to point to a wall, a table, or other surface instead of the actual speaker.

One solution to the problem of directing a camera during a videoconference is disclosed in US Pat. Pub. No. 2002/0101505 to Gutta et al., which discloses methods and apparatus using acoustic and visual cues to predict when a participant is going to speak or stop speaking. As shown in FIG. 1, an adaptive position locator 30 disclosed in Gutta et al. includes a wide-angle camera 20, a microphone array 22, and a pan-tilt-zoom camera 34. During a videoconference, the locator 30 processes audio and video to locate a speaker.

To do this locating, the wide-angle camera 20 and the microphone array 22 generate signals at initial startup. The signals from the wide-angle camera 20 pass to a face recognition module 32, which has a face detector to determine whether or not a given region of interest (window) can be labeled as a face region so a unique identifier can be assigned to a given face. Likewise, signals from the microphone array 22 pass to a speaker identification module 33 and an audio locator 36, which obtains directional information that identifies pan and tilt angles associated with a participant who is speaking.

Then, the images from the wide-angle camera 20 along with the results of face recognition and their locations are stored in a frame buffer 39 along with the audio signals from the microphone array 22 and the results of the speaker identification. The audio and video signals are accumulated for a predefined interval, and a motion detector 35 detects motion in the video frames occurring during this interval. In the end, a space transformation module 37 receives position information from the motion detector module 35 and directional information from the audio locator 36 and then maps the position and direction information to compute a bounding box used to focus the PTZ camera 34.

At this point, a predictive speaker identifier 40 identifies one or more acoustic and visual cues to predict the next speaker. In particular, the predictive speaker identifier 40 processes the video from the PTZ camera 34 and the contents of the frame buffer 39 and speaker identification module 33. As noted above, the contents of the frame buffer 39 include the wide-angle images from the wide-angle camera 34 and the corresponding face recognition results, the audio signals from the microphone array 22, and the corresponding speaker identification results. Based on this information, the predictive speaker identifier 40 can identify the visual and acoustic cues of each non-speaking participant from the wide-angle image and audio signals. Ultimately, the speaker predictions generated by the predictive speaker identifier 40 are used to focus the PTZ camera 34 at the next predicted speaker.

As can be seen above, systems that use voice tracking and face detection may require complex processing and hardware to control a camera during a videoconference. Moreover, such systems can have practical limitations. For example, such systems may require an operator to manually initiate the automated operation by pressing a button. This is so because such systems require a sufficient period of time for training to operate properly. For example, such a system has to work in a training mode first and then has to switch to an active mode, such as a predictive mode to predict who will speak. The switching from training mode to active mode requires the manual user intervention. As example of this required intervention and training is discussed in Gutta et al. noted above.

Yet, requiring manual initiation of the automated functions can cause problems when people walk in or out of a room during a meeting. Additionally, for the automated control of the camera to operate properly, all of the participants need to face the camera. For example, the automated control of the camera fails when a participant turns his head away from the camera, which can happen quite often in a video conference.

What is instead needed is a way to automatically control a camera during a videoconference based on the meeting environment, arrangement of participants, and the dynamics of the videoconference that does not require such complex processing and hardware to achieve, yet still produces a dynamic videoconference experience even when participants are turned away from the camera or microphones.

SUMMARY OF THE DISCLOSURE

In a videoconference apparatus and method, a stationary or fixed view of an environment is obtained with a stationary or fixed camera of the apparatus and is coordinated with an adjustable view of the environment obtained with a second, adjustable camera. In one arrangement, the stationary camera is a web camera, while the adjustable camera is a controllable camera, such as a pan-tilt-zoom camera, although other arrangements can be used. These two cameras are preferably co-located in or on a shared housing location. Being co-located, the cameras share the same view angle of the environment, and their two views can be more readily aligned for coordination.

During the videoconference, the stationary camera obtains stationary video in the stationary view of the environment, while the adjustable camera can obtain active video in the adjustable view of the environment. For the purposes of the videoconference, the stationary video may be used primarily to determine locations of participants and may not be output for the videoconference, although this is possible in some circumstances. The active video of the adjustable camera, however, may be used as primary video for output in the videoconference.

As the videoconference proceeds, the apparatus detects any faces of participants in the stationary video captured with the stationary camera. Detecting the faces of participants can be based on techniques involving one or more of face detection, facial recognition, motion detection, and human skin tone detection. Rather than taking the detection at face value, the apparatus verifies whether the detected faces are reliable faces by analyzing areas of the stationary video associated with each of the detected faces for motion. Some examples of the verification are discussed below:

For example, the area of interest for a detected face can include an on-face section at the location of the detected face. If motion is detected at this on-face section for a given detected face, then the apparatus can indicate the given face as reliable. Rather than just disregarding the given detected face when motion detection fails to find motion in the on-face section, the apparatus can instead determine whether the location of the given face was previously detected and indicated as reliable. If so, then the face detection can still be reliable even though motion has not been detected in the on-face section.

In another example, the area of interest for a detected face can further include surrounding sections around the on-face section of the detected face. These surrounding sections can be analyzed for motion to verify that a detected face is reliable by determining whether a person has moved (or is moving) from the location of the detected face. In this sense, the motion detection of the apparatus verifies a face by finding an absence of motion. For example, previous face detection may have been made finding a reliable face at a particular location, but current processing may have not detected the face. This may be because the person has turned her head away from the camera, may have obscured her face, etc., or the face detection may have failed for whatever reason. The apparatus determines that the person is still at this location by verifying that no motion is detected in the surrounding sections of the previously detected face.

After verifying the reliable faces, the apparatus determines a boundary in the stationary view of the environment containing the reliably detected faces of the participants. To then capture and output video of the participants for the videoconference, the apparatus adjusts the adjustable view of the adjustable camera to a framed view of the environment based on the determined boundary. In the end, active video captured in the framed view with the adjustable camera can be sent to a far-end for the videoconference.

During the videoconference, participants may join or leave the environment, or they may move in the environment. Therefore, the apparatus determines the boundary on an active basis, such as at regular intervals on a frame-by-frame basis, and adjusts any current boundary with a new boundary as needed. For example, the apparatus adjusts to a new boundary when a participant moves out of a current boundary, a new participant enters the environment in the stationary view outside the boundary, etc.

To keep track of the faces of participants, the apparatus stores current face locations of the participants' faces in the stationary view. When processing the stationary video for face detection, the apparatus can then determine whether any new face locations differ from those previous locations for faces. Based on a change in the environment, the apparatus can then adjust the boundary so that all of the faces of the participants can be framed by the adjustable camera. Determining the face locations and adjusting the view of the adjustable camera can be further augmented using audio captured in the environment to determine bearing angles of source locations of audio from the participants and coordinating the audio source locations to the detected face locations.

The foregoing summary is not intended to summarize each potential embodiment or every aspect of the present disclosure.

BRIEF DESCRIPTION OF THE DRAWINGS

FIGS. 3A-1 and 3A-2 illustrate the endpoint having a videoconferencing unit connected to a video device, which has a main camera and an adjunct camera.

FIG. 3B schematically illustrates the endpoint of FIGS. 3A-1 and 3A-2.

FIG. 5 illustrates a flowchart showing the processing performed by the disclosed endpoint.

DETAILED DESCRIPTION OF THE DISCLOSURE

A. Videoconferencing Endpoint

Figure 2A:
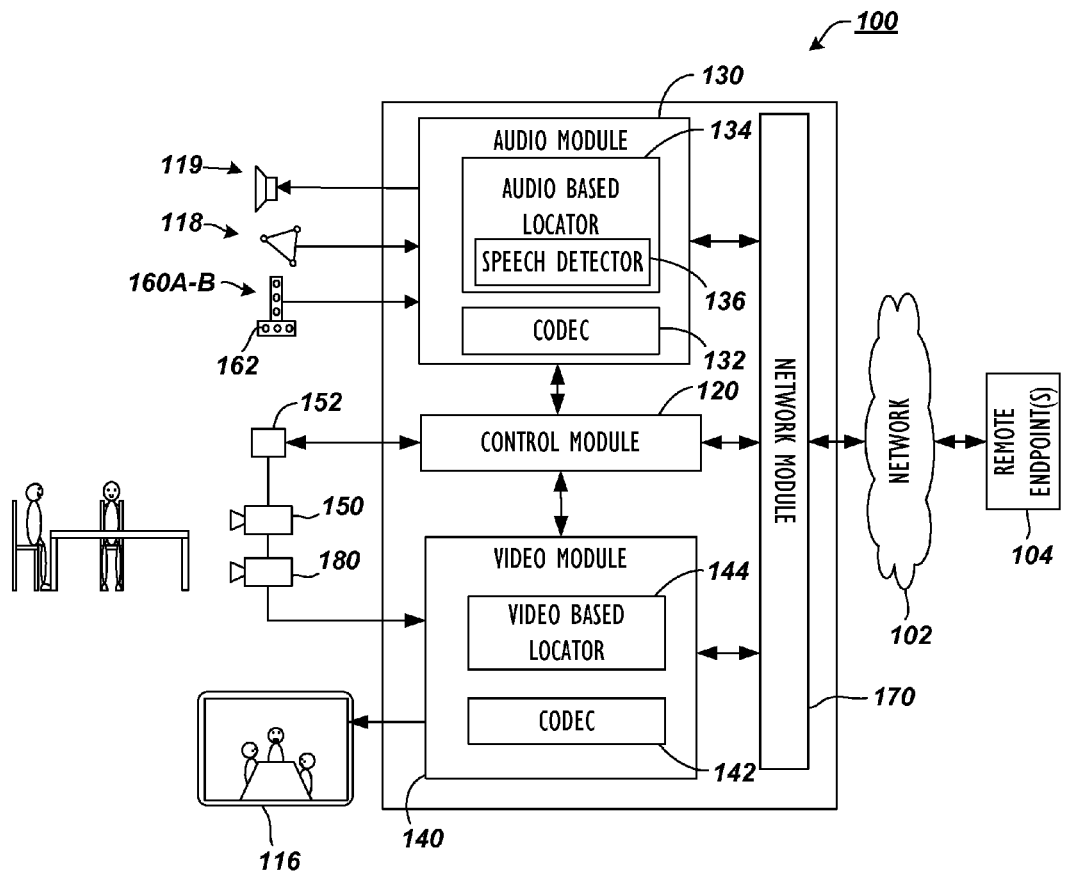
FIG. 2A illustrates a videoconferencing endpoint according to certain teachings of the present disclosure.

A videoconferencing apparatus or endpoint 100 in FIG. 2A communicates with one or more remote endpoints 104 over a network 102. Among some common components, the endpoint 100 has an audio module 130 with an audio codec 132 and has a video module 140 with a video codec 142. These modules 130/140 operatively couple to a control module 120 and a network module 170.

During a videoconference, a main camera 150 captures video and provides the captured video to the video module 140 and codec 142 for processing. Additionally, one or more microphones 118 capture audio and provide the audio to the audio module 130 and codec 132 for processing. These microphones 118 can be table or ceiling microphones or part of a microphone pod or the like, and the endpoint 100 uses the audio captured with these microphones 118 primarily for the conference audio.

Separately, if available for the endpoint 100, microphone arrays 160A-B having orthogonally arranged microphones 162 may also capture audio and provide the audio to the audio module 130 for processing. Preferably, the microphone arrays 160A-B include both vertically and horizontally arranged microphones 162 for determining locations of audio sources during the videoconference. Therefore, the endpoint 100 can use the audio from these arrays 160A-B primarily for camera tracking purposes and not for conference audio, although their audio could be used for the conference.

After capturing audio and video, the endpoint 100 encodes them using any of the common encoding standards, such as MPEG-1, MPEG-2, MPEG-4, H.261, H.263 and H.264, and the network module 170 outputs the encoded audio and video to the remote endpoints 104 via the network 102 using any appropriate protocol. Similarly, the network module 170 receives conference audio and video via the network 102 from the remote endpoints 104 and sends these to their respective codec 132/142 for processing. Eventually, a loudspeaker 119 outputs conference audio, and a display 116 outputs conference video. Many of these modules and other components can operate in a conventional manner well known in the art so that further details are not provided here.

For the disclosed endpoint 100, the main camera 150 can be a steerable Pan-Tilt-Zoom (PTZ) camera or an Electronic Pan-Tilt-Zoom (EPTZ) camera. Either way, the main camera 150 can be adjusted, steered, or directed to alter its viewing orientation of the environment. To control the view captured by the main camera 150, the endpoint 100 uses an audio-based locator 134 and/or a video-based locator 144 to determine locations of participants and frame views of the environment and participants. Then, the control module 120 operatively coupled to the audio and video modules 130/140 uses audio and/or video information from these locators 134/144 to send camera commands to the main camera 150 to alter its viewing orientation. For example, these camera commands can be implemented by an actuator or local control unit 152 having motors, servos, and the like that steers the camera 150 mechanically. Alternatively, these camera commands can be implemented as electronic signals to be handled by the camera 150.

To determine the viewing orientation, the control module 120 as noted above uses audio information obtained from the audio-based locator 134 and/or video information obtained from the video-based locator 144. For example and as described in more detail below, the control module 120 uses audio information processed by the audio-based locator 134 from the horizontally and vertically arranged microphone arrays 160A-B. The audio-based locator 134 then uses a speech detector 136 to detect speech in captured audio from the arrays 160A-B and determines a location of a current speaker. The control module 120 uses the determined location of the speech to then steer the main camera 150 toward that location so the camera 150 can capture video of a current speaker if desired.

In contrast to what is conventionally done with an endpoint, the disclosed endpoint 100 uses an adjunct camera 180 to perform a number of useful purposes. In particular, the adjunct camera 180 can count the number of participants in the near-end environment (e.g., room) using face detection. In turn, the endpoint 100 can use this information in tracking the participants and can forward this information to the far-end endpoints 104, to a multi-point control unit (not shown), or to some other device. How the adjunct camera 180 can be used to count participants will be explained later with reference to the face detection used by the endpoint 100.

The endpoint 100 can also use the adjunct camera 180 to determine the dynamic environment of the videoconference. In particular, the endpoint 100 can process video from the adjunct camera 180 to frame the participants in the room more effectively or to make optional close-up views on an active speaker. Moreover, the endpoint 100 can process video from the adjunct camera 180 so the endpoint 100 can automatically control the viewing orientation of the main camera 150 to meet the conference's dynamic needs.

In one embodiment, the adjunct camera 180 can be stationary, although an adjustable camera may be used. In general, the adjunct camera 180 captures a wide, stationary view of the environment in contrast to the adjustable view obtained with the main camera 150. During the videoconference, the adjunct camera 180 therefore captures wide-angle video of the environment, which gives context to the adjustable view of the main camera 150. In turn, the control module 120 uses video information processed by the video-based locator 144 from the adjunct camera 180 to determine the locations of participants, to determine the framing for the view of the main camera 180, and to direct the main camera 150 at the participants.

Preferably, the wide, stationary video from the adjunct camera 180 is not sent from the endpoint 100 to the far-end endpoints 104 because the video may be of lower quality, may be too wide, or may have other issues. However, in some situations, the wide, stationary video from the adjunct camera 180 can be displayed at the far-end endpoints 104 when multiple participants at the near-end are speaking or when the main camera 150 is moving to direct at one or more speakers. Transitions between the two video views from the cameras 150 and 180 can be faded and blended as desired to avoid sharp cut-a-ways when switching between camera views. Details of such coordination are disclosed in co-pending U.S. Pat. Pub. 2011/0285808, filed 18 May 2010 and entitled "Videoconferencing Endpoint Having Multiple Voice-Tracking Cameras," which is incorporated herein by reference in its entirety.

Figure 2B:
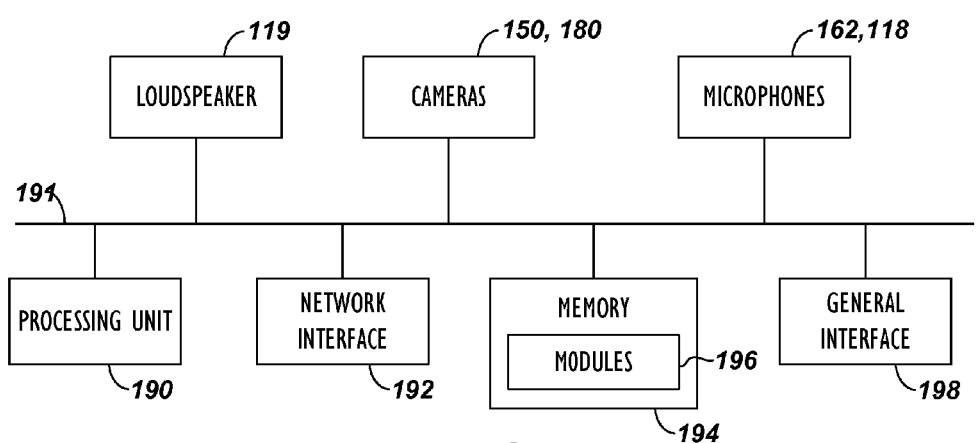
FIG. 2B schematically illustrates components of the endpoint of FIG. 2A.

Having a general understanding of the endpoint 100 and how the two cameras 150 and 180 can be used, discussion now turns to FIG. 2B to briefly discuss some exemplary components for the endpoint 100. As shown and discussed above, the endpoint 100 has the main camera 150, the adjunct camera 180, and the several microphones 118/162A-B. In addition to these, the endpoint 100 has a processing unit 190, a network interface 192, memory 194, and a general input/output (I/O) interface 198, which are all coupled via a bus 191. Each of these components can be on a single device or can be shared between separate devices depending on how the endpoint 100 is implemented as discussed below.

The memory 194 can be any conventional memory such as SDRAM and can store modules 196 in the form of software and firmware for controlling the endpoint 100. In addition to video and audio codecs and other modules discussed previously, the modules 196 can include operating systems, a graphical user interface (GUI) that enables users to control the endpoint 100, and algorithms for processing audio/video signals and for controlling the main camera 150 as discussed later.

The network interface 192 provides communications between the endpoint 100 and remote endpoints (not shown). By contrast, the general I/O interface 198 provides data transmission with local devices such as a keyboard, mouse, printer, overhead projector, display, external loudspeakers, additional cameras, microphone pods, etc. The endpoint 100 can also contain an internal loudspeaker 119.

The cameras 150 and 180 and the microphone arrays 160A-B capture video and audio, respectively, in the videoconference environment and produce video and audio signals transmitted via the bus 191 to the processing unit 190. Here, the processing unit 190 processes the video and audio using algorithms in the modules 196. For example, the endpoint 100 processes the audio captured by the microphones 118/162A-B as well as the video captured by the adjunct camera device 180 to determine the location of participants and direct the main camera 150. Ultimately, the processed audio and video can be sent to local and remote devices coupled to interfaces 192/198.

B. Video Device of Endpoint

Before turning to operation of the endpoint 100 during a videoconference, discussion first turns to example implementations of the disclosed endpoint 100. In general, the various modules (e.g., 120, 130, 140, 170) and components (e.g., 150, 160A-B, 180) of the endpoint 100 can be implemented as one unit, such as a videoconferencing unit, or they may be shared between two or more units, such as a videoconferencing unit and another video processing device, such as disclosed below.

Figure 1:
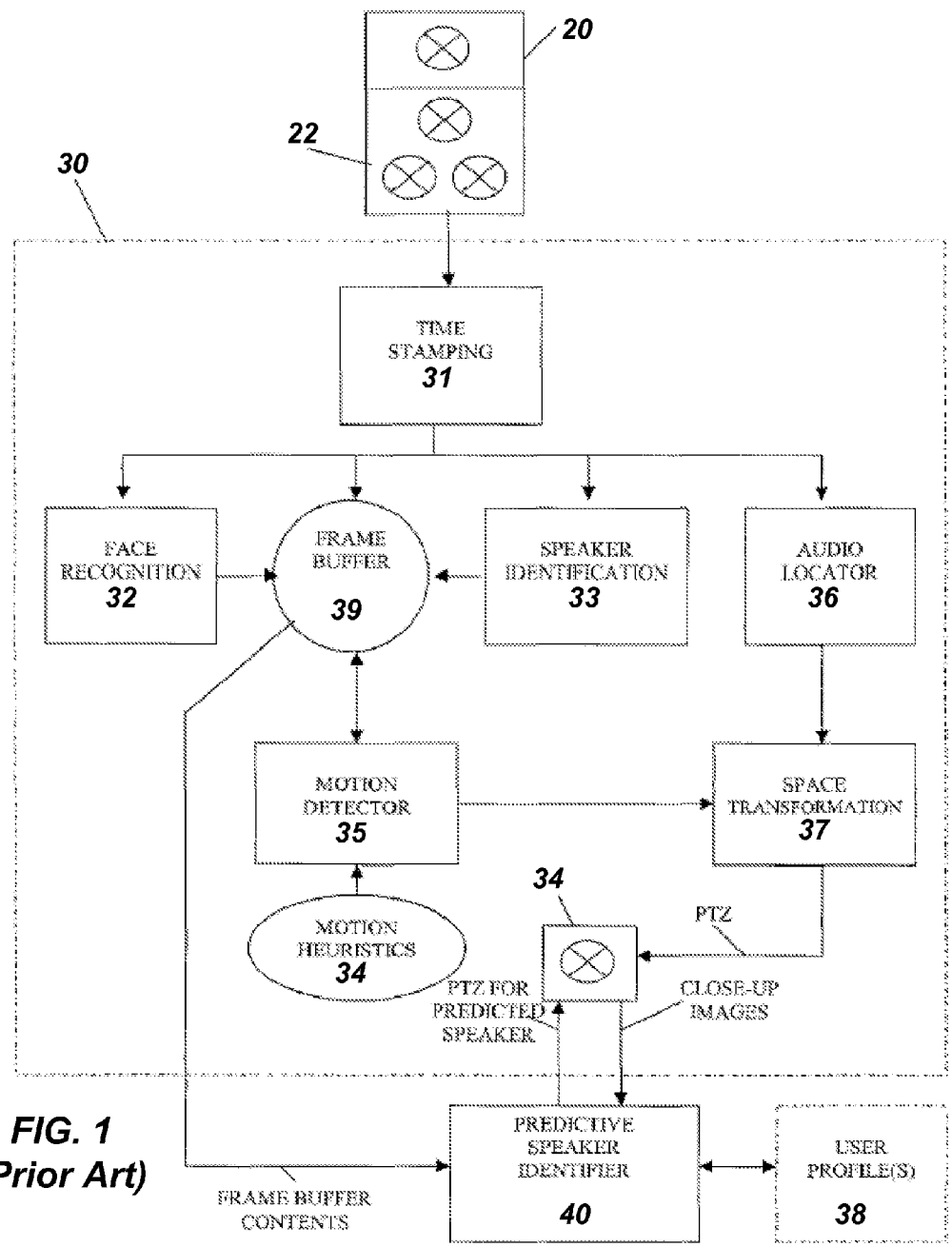
FIG. 1 illustrates a functional block diagram of an adaptive position locator according to the prior art.

Turning to FIGS. 3A-1 and 3A-2, a video processing device 110 according to the present disclosure for the disclosed endpoint 100 couples to a separate unit 115, which can be a stand-alone videoconferencing unit or can be a personal computer configured for desktop videoconferencing. The video device 110 has a housing and may or may not have horizontal and vertical microphone arrays 160 disposed thereon. If present, these arrays 160 can each have three microphones, although either array 160 can have a different number than depicted.

In general, the video device 110 can include all or part of the necessary components for conducting a videoconference, including audio and video modules, a network module, a control module, etc., as discussed above. Alternatively, all or some of the necessary videoconferencing components may be housed in the separate unit 115 coupled to the device 110. Thus, the video device 110 may be a stand-alone unit having the main camera 150, the microphone arrays 160 (if present), the adjunct camera 180, and other related components, while the separate unit 115 can handle all of the videoconferencing functions. Of course, the video device 110 and the separate unit 115 can be combined into one unit if desired.

1. First Example of Video Device

As shown, the video device 110—when a separate component as in FIG. 3A-1—can couple to the videoconferencing unit 115 via an RS-232 serial cable or the like. In general, the adjunct camera 180 can be integrated into or separately coupled to the housing of the video device 110. Either way, the adjunct camera 180 is physically co-located with the main, adjustable camera 150. If the adjunct camera 180 is a separate component from the video device 110, then the adjunct camera 180 can connect to the videoconferencing unit 115 via a USB cable, Ethernet cable, wireless connection, or the like that sends video signals. Of course, other connections can be used for other housing configurations for the unit 115, device 110, and cameras 150 and 180.

In one arrangement as shown in FIG. 3A-1, the adjunct camera 180 can be a webcam or comparable type of camera that installs onto or is added to the video device 110, which has the main camera 150. For example, the housing for the video device 110 may have a holder and electronic connector (not shown) for holding and connecting the adjunct camera 180 onto the video device 110. Alternatively, the adjunct camera 180 can be a camera of a peripheral device, such as a portable cellphone, tablet, laptop, PC-based web cam, or the like, and the housing for the video device 180 may include a holder and a connector (not shown) for such a peripheral device.

2. Second Example of Video Device

In another arrangement, the adjunct camera 180 can be a second camera of a dual camera unit, such as disclosed in incorporated U.S. Pat. Pub. 2011/0285808. For example, FIG. 3A-2 shows an embodiment of the video device 110 having two integrated cameras 150 and 180. Although both cameras may be mechanical or electronic PTZ cameras, the adjunct camera 180 may not be expected to move during the videoconference because it may be used to obtain the stationary, wide view of the surrounding environment according to the purposes disclosed herein.

3. Components of Video Device as Stand-Alone Unit

Either way the video device 110 is implemented, the adjunct camera 180 captures video in a stationary, wide view of the videoconferencing environment. As such, the adjunct camera 180 need not be designed or expected to move during the videoconference to obtain the view of the surrounding environment. Additionally, the adjunct camera's captured video can be continuous video, intermittent video clips, or even video stills or frame, as processing capabilities may dictate. The video resolution of the adjunct camera 180 is preferably high, such as 1080p or 720p, to help the face finding algorithm detect participants' faces even if far away in a large room—i.e., the higher the resolution, the larger room that can be covered. The frame rate of the adjunct camera 180 can be low to reduce compute costs, and a low frame rate of less than 5 fps may be used. However, a higher frame rate is generally better for motion tracking if compute costs are not an issue. Still, the frame rate of the adjunct camera 180 can still be low for the motion detector 204 to operate according to the purposes disclosed herein, and even a frame rate as low as 2 frames per second can be used, which may be a practical frame rate available in some implementations due to limited computing powers, limited data bandwidth, or other reason. Furthermore, the video device 110 may be able to adjust the frame rate during processing depending on whether motion is to be used to track movements and whether compute resources are available.

By contrast, the main camera 150 is a controllable camera and is intended to obtain directed views of the videoconference environment. The main camera 150, therefore, has a video resolution and frame rate suitable for videoconferencing, which can be a video resolution up to 1920×1080 (1080p) resolution or 1280×720 (720p) up to 60 fps. The main camera 150 can have image processing components 152 that can include an actuator if not an EPTZ camera, and the components 152 can be operatively coupled to a local control unit housed in the device 110.

FIG. 3B shows some exemplary components that can be part of the video device 110 of FIGS. 3A-1 and 3A-2, especially when the device 110 is a stand-alone unit. The video device 110 includes the microphone arrays 160, a control processor 111, a Field Programmable Gate Array (FPGA) 112, an audio processor 113, and a video processor 114. As noted above, the video device 110 can be an integrated unit having the main camera 150 integrated therewith and having the adjunct camera 180 separately connected onto the device's housing, or the adjunct camera 180 and the main camera 150 can be integrated with the device 110.

During operation, the FPGA 112 captures video inputs from the cameras 150 and 180 and sends the input video to the video processor 114. The FPGA 112 can also scale and composite video and graphics overlays. The audio processor 113, which can be a Digital Signal Processor, captures audio from the microphone arrays 160 and performs audio processing, including echo cancellation, audio filtering, and source tracking.

The video processor 114, which can also be a Digital Signal Processor (DSP), captures video from the FPGA 112 and handles motion detection, face detection, and other video processing to assist in tracking speakers as described in more detail below. For example, the video processor 114 can perform a motion detection algorithm on video captured from the adjunct camera 180 to check for motion. This can avoid directing the main camera 150 at reflections from walls, tables, or the like. In addition, the video processor 114 can use a face-finding algorithm on the video from the adjunct camera 180 to further increase the tracking accuracy by confirming that a candidate speaker location does indeed frame a view having a human face. Detecting a human face can use biometric analysis looking for features of the human face and other known techniques available in the art. Furthermore, biometric measurements of the detected face can be used as an identifier and can be associated with other information about the detected face, such as location, size, tone, etc., to uniquely identify the face and the underlying participant.

The control processor 111, which can be a general-purpose processor (GPP), handles communication of the device 110 with the videoconferencing unit 115 and handles camera control and overall system control of the device 110. For example, the control processor 111 controls the pan-tilt-zoom communication for the main camera 150 and controls the camera switching by the FPGA 120.

C. Operation of the Endpoint During Auto-Framing

With an understanding of the components of the endpoint 100 from FIGS. 2A through 3B, discussion now turns to how the adjunct camera 180 can be used to improve operation of the endpoint 100 during a videoconference so the endpoint 100 can analyze video from the camera 180 and automatically frame participants in the environment in a dynamic way as the videoconference is conducted.

Overall, the endpoint 100 performs auto-framing of the dynamic conferencing environment effectively using the adjunct camera 180, face detection, and motion detection. The framing is automatic or dynamic as the videoconference is conducted without the need for user intervention. For example, the endpoint 100 adjusts the bounded view of the main camera 150 dynamically when people walk in or out of the videoconference environment. Additionally, the auto-framing functions when participants turn their heads whichever way they want during the videoconference—even to the point that the participants turn away from the camera 180 and their faces are no longer visible to the camera 180.

1. Software and Auto-Framing Process

Figure 4:
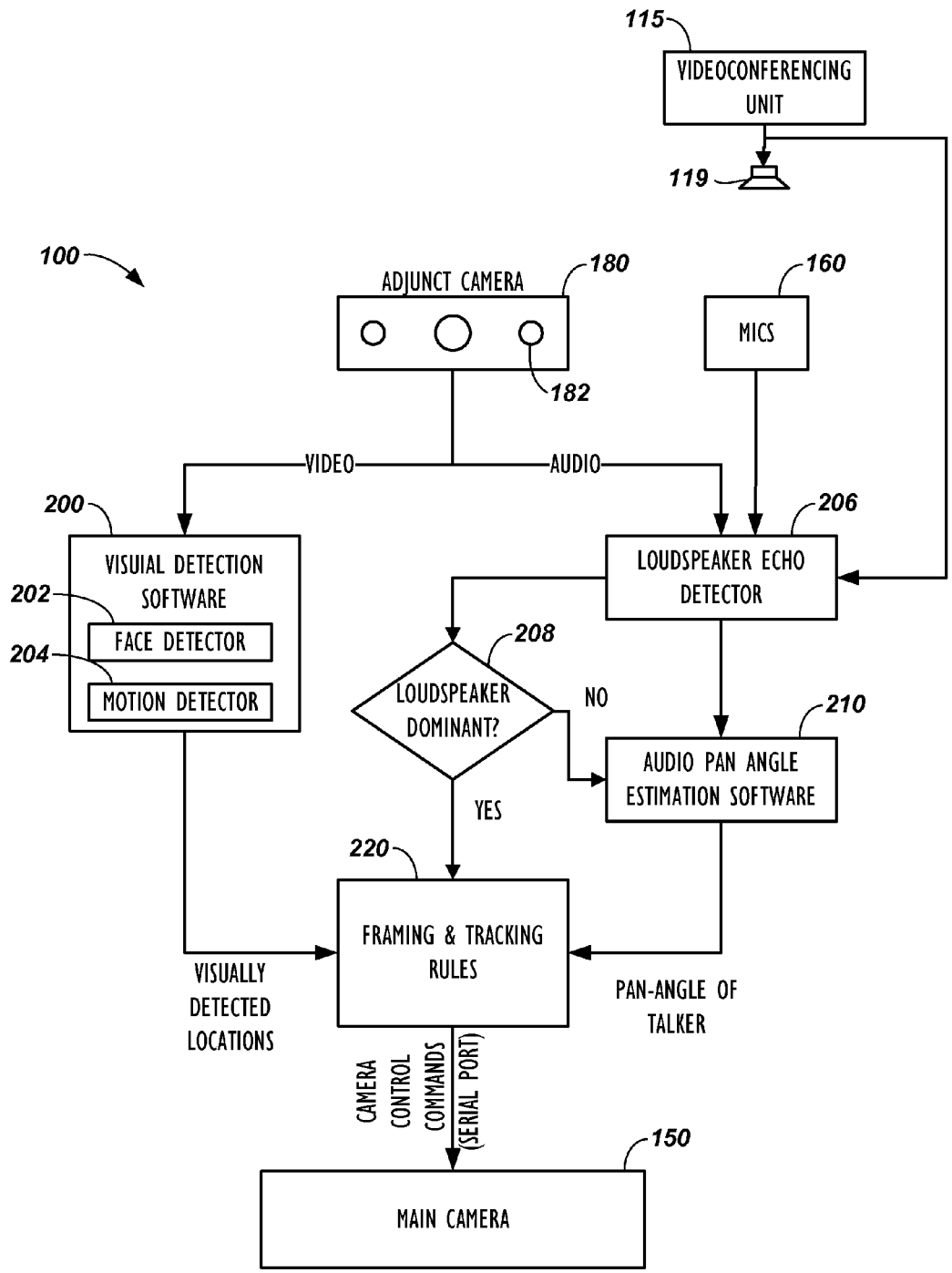
FIG. 4 schematically illustrates software processing performed by the disclosed endpoint.

Turning to the block diagram of the endpoint 100 in FIG. 4 and the auto-framing process 250 in FIG. 5, operation begins with the endpoint 100 capturing video from both cameras 150 and 180 (Blocks 252 and 254). (To facilitate discussion, reference numerals from previous figures are used throughout the description of the process 250.) As the videoconference proceeds, the endpoint 100 analyzes the video captured with the adjunct camera 180 (Block 256) and detects faces (Decision 258). As shown in the endpoint 100 of FIG. 4, for example, the video from the adjunct camera 180 is sent to a visual detection software module 200 that detects the visual location of all the participants in the room. Using a face detector 202, for example, the endpoint 100 detects where people are located at the near-end of the videoconference during a particular time interval. This determination can use processing techniques known in the art for face detection and facial recognition based on recognizable characteristics and locating a source through tracking. Additionally, the visual detection software module 200 uses a motion detector 204 to detect motion in the adjunct camera's video and can use skin tone detection and other video processing techniques.

Once a participant (e.g., a face) is visually detected in the adjunct camera's view (Decision 258) as shown in FIG. 5, the endpoint 100 determines whether this is a new participant (Decision 260). This would naturally be the case if the videoconference just started. During later processing, however, the endpoint 100 can determine that the detected participant is a new participant by tracking and storing previous locations of participants' faces and finding a detected face for a participant in a new location not previously tracked.

If a new participant (e.g., a new face) is detected, the endpoint 100 determines the position of the detected participant (Block 262). In particular, the endpoint 100 can determine the position, orientation, size, tone, biometric measurements, etc. of the detected face, and this face-related information is used for facial recognition and tracking and in the framing and tracking rules discussed below. Then, the endpoint 100 determines what adjustment is needed for the main camera 150 to frame all of the detected participants (i.e., all of the detected faces) according to the framing and tracking rules (Block 264). A number of techniques can be used to determine the location of a detected face relative to the main camera 150. Some of these are described below.

In one example, the endpoint 100 can use face detection techniques to detect and locate faces in the adjunct camera's stationary view. For example, the endpoint 100 can find faces by finding regions that are likely to contain human skin, and then from these, the endpoint 100 can find those regions that indicate the location of a face in the captured view. Details related to skin tone and face detection (as well as audio locating) are disclosed in U.S. Pat. No. 6,593,956 entitled "Locating an Audio Source," which is incorporated herein by reference in its entirety. Motion detection may also be used to detect faces. Then, knowing the location of the faces in the adjunct camera's view, the endpoint 100 can adjust the pan, tilt, and/or zoom of the adjustable camera 150 to fit the location of all of the detected faces.

In addition, if the adjunct camera 180 has its own microphones 182 as shown in FIG. 4 or if the endpoint 100 has microphone arrays 160, such as in FIG. 2A, the endpoint 100 can process audio from those microphones using a pan-angle estimation software module 210 as shown in FIG. 4 to estimate the angular orientation of the person talking. This module 210 can be based on audio processing techniques used for a linear microphone array, which uses the phase information of the microphone signals, or the audio processing techniques of the pan-estimation software module 210 can use any other available technique to determine the pan angle of an audio source.

Continuing with the process 250 in FIG. 5, once the participants (e.g., faces) are located in the adjunct camera's video, the endpoint 100 converts the locations into camera commands (pan-tilt-zoom coordinates) to adjust the view of the main camera 150. When adjusted, the main camera 150 can then capture all of the participants in the environment so all of the participant's faces are framed in the main camera's view (Block 266).

Preferably, the face detection discussed above also uses a motion detection assessment (Block 280) to enhance the face detection of the endpoint 100. In this assessment 280, the endpoint 100 process the video from the adjunct camera 180 for motion in conjunction with face detection so the endpoint 100 can deal with various situations, such as when a participant turns his head away from the video device 110. Further details related to this face detection and motion detection are discussed below with reference to FIGS. 7 through 10B.

Because there may be challenges to framing the faces of the participants, the endpoint 100 determines if the faces are framed properly in the current view (Decision 268). If not, the endpoint 100 searches the active view and/or adjacent portions of the camera's view to adjust the view to frame the faces (Block 270). Adjusting the view can be repeated as many times as needed and can involve processing video from both the main camera 150 and the adjunct camera 180. Ultimately, if the faces' locations cannot be determined or the faces cannot be properly framed, the endpoint 100 may adjust the main camera 150 to a default wide-view (Block 254).

Using the video and audio information, for example, a framing and tracking rules software module 220 as shown in FIG. 4 uses ad-hoc rules to send framing adjustments to the main camera 150. The sent framing adjustments are based on the location of participants (e.g., the locations of their faces) and the pan-angle of the talker, and the commands sent to the main camera 150 are intended to optimally frame the people in the room. These framing adjustments can also be used to track a particular participant and to zoom in and out on various participants that are talking depending on the configuration.

Several techniques can be used for determining if the current view of the main camera 150 properly frames the current participants. For example, once the main camera 150 is done steering, the endpoint 100 can use spatial algorithms to point the center focus of the main camera 150 at a central point between the detected face locations. Additionally, the outside boundary from the zoom of the main camera 150 may be set to define a boarder region of a specific size (i.e., number of pixels relative to overall width or height of the zoomed view) outside the outlying detected faces in the view.

If the algorithm reports good framing (Decision 268), the endpoint 100 outputs the framed view (Block 270). If good framing is not reported, then the position of the main camera 150 is fine-tuned to continue searching for good framing (Block 272). If good framing still cannot be found, the endpoint 100 may switch to a default wide view of the main camera 150 (Block 254).

2. Isolating Loudspeaker Audio when Adjunct Camera has Microphones

When the adjunct camera 180 includes microphones 182 to track participants as shown in FIG. 4, the endpoint 100 preferably does not process audio signals captured when the loudspeaker 119 of the endpoint 100 is outputting audio. For example, if the loudspeaker 119 is disposed on a table where the participants are seated, the microphones 182 of the adjunct camera 180 would detect the loudspeaker 119 as an audio source when the endpoint 100 outputs audio for the loudspeaker 119. Moreover, even if the loudspeaker 119 is not in the field of view of the adjunct camera 180, any sound reflected in the room when the loudspeaker 119 outputs audio can be detected by the adjunct camera's microphones 182 as a source. A number of techniques can be used to handle this situation.

In one technique, operation of the adjunct camera 180 can be integrated into the operation of the videoconferencing unit 115. In this way, any audio processing of the microphones 182 associated with the adjunct camera 180 can be disabled when the videoconferencing unit 115 outputs audio for the loudspeaker 119. For this integrated operation, internal components within the endpoint 100 will be able to coordinate when to disable audio processing the adjunct's microphones 182 when the loudspeaker 119 outputs audio.

More interestingly, when the adjunct camera 180 is integrated into the video device 100 and processing of the adjunct camera's microphones 182 is handled separately from the loudspeaker 119 of the videoconferencing unit (115), then disabling processing of audio from the adjunct camera's microphones 182 may be less straight-forward. When data communication is possible between the unit (115) and the video device 110 having the adjunct camera 180, then a signal from the unit 115 can indicate to the video device 110 that audio is being sent to the loudspeaker 119 for output, and the video device 110 can disable processing the audio from the adjunct's microphones 182.

Alternatively, the video device 110 can uses a far-end echo detector 206, similar to what is disclosed in U.S. Pat. Pub. 2011/0069830 incorporated herein by reference, to determine when audio is being output by the loudspeaker 119 so the loudspeaker's audio can be isolated from the input signals captured by the adjunct camera's microphones 182. The loudspeaker echo detector receives the microphones' signal(s) and the loudspeaker signal as inputs. In general, the far-end echo detector 206 examines the correlation between the loudspeaker signal and the microphone signal and determines whether there is a predominant presence of the loudspeaker signal in the microphone signal. The detector 206 decides if the loudspeaker signal is predominant (Decision 208). If so, then the framing and tracking rules of the module 220 will not zoom in on the location of the loudspeaker 119 because the audio pan angle estimation module 210 may be bypassed or ignored. If the loudspeaker signal is not dominant, then the framing and tracking rules of the module 220, if configured to do so, will be free to decide to zoom in on a talker located by the pan angle estimation module 210.

Finally, since the location of the loudspeaker 119 may remain the same in the environment regardless of which participants are present, the video device 110 can recognize that this location corresponds to the loudspeaker 119 and not to a participant so that audio detection and pan angle estimation associated with the loudspeaker's location can be ignored.

3. Example of Auto-Framing

Now that operation of the endpoint 100 has been described above with reference to FIGS. 4-5, discussion turns to FIGS. 6A-6D, which diagram an example of how the endpoint 100 can use video from the adjunct camera (180) to determine and control the view obtained with the main camera (150). A depicted wide view 300 represents the video view captured by the adjunct camera (180) of the videoconferencing environment. The wide view 300 is shown divided into several blocks 302 (9×9 in this example, but any other value could be used). The blocks 302 can preferably be macroblocks having a suitable block size of pixels, as commonly used by video compression algorithms. Each of these blocks 302 may correlate to particular pan, tilt, and zoom coordinates of the main camera (150), which can be determined by the given geometry.

Figure 6A:
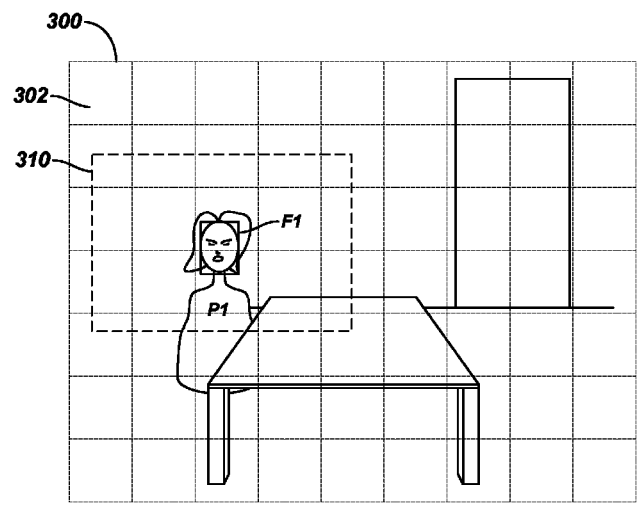
FIGS. 6A-6D illustrate examples of face detection and camera adjustments performed by the disclosed endpoint.

At the start of the videoconference as shown in FIG. 6A, there may be a single participant P1 present in the environment. Processing as described herein detects the face F1 of the participant P1 and determines the location of the face F1 in the adjunct camera's stationary view 300 of the environment. Based on this determined location, the main camera (150) is directed to capture a framed view 310 of the single participant P1.

Figure 6B:
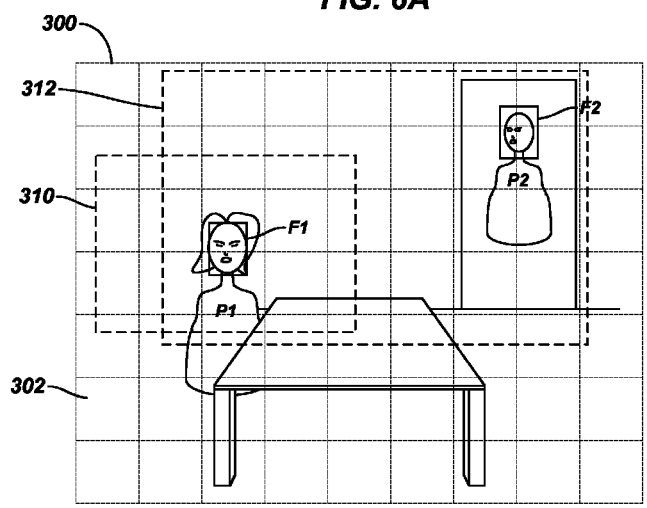

At some point as shown in FIG. 6B, another participant P2 may enter the environment. Depending on the arrangement, this participant P2 may not be visible within the initial boundary of the framed view 310 of the first participant P2. Yet, the adjunct camera 180 captures the new participant P2 in the camera's wide, stationary view 300. Face detection as discussed herein detects the new participant's face F2 in this view 300, and the endpoint 100 determines a new framed view 312 to incorporate the faces F1 and F2 of the two participants P1 and P2.

Preferably, the endpoint 100 does not adjust the view of the main camera 150 when a participant's face is "moving," as would occur when a participant is walking into a room, for example. Instead, the main camera 150 is adjusted when the face has "settled," meaning that the face has had practically the same position for some period of time or for some number of frames. This feature can be especially useful when people walk in or out of a room when the videoconference call begins.

In this example, assuming that the new participant P2's face has "settled" (e.g., the participant P2 has remained at the door for a certain period of time or a number of frames), the endpoint 100 determines that the initial boundary of the framed view 310 contains less than all of the faces F1 and F2 detected in the current stationary view 300 being processed. Knowing the locations of the detected faces F1 and F2 (i.e., knowing which blocks 302 of the stationary view 300 contain the faces F1 and F2), the endpoint 100 determines a subsequent boundary for a new framed view 312 by adjusting the initial boundary to contain all of the detected faces F1 and F2 in the stationary view 300.

As part of this processing, the locations of participants' faces in the stationary view 300 can be stored in memory. For instance, the location of the first participant's face F1 in the wide view 300 would initially be stored. Then, after a time interval, the endpoint 100 processes the stationary view 300 again to detect one or more new face locations of any new faces in the environment by performing face detection in the adjunct camera's stationary view 300. If a new face is detected (e.g., second participant's face F2) as noted above, the endpoint 100 can detect a difference between the current face locations (e.g., face F1's location) and the new face locations (e.g., face F2's location) and can adjust the boundary for the main camera 150 based on the detected difference in face locations.

After initial framing in the adjusted view 312 of the main camera (150) to capture the faces F1 and F2 of both participants P1 and P2, the new participant P2 may move in the environment while the original participant P1 stays in place or vice-versa. As this occurs, the framed view 312 of the main camera 150 is adjusted as needed.

Figure 6C:
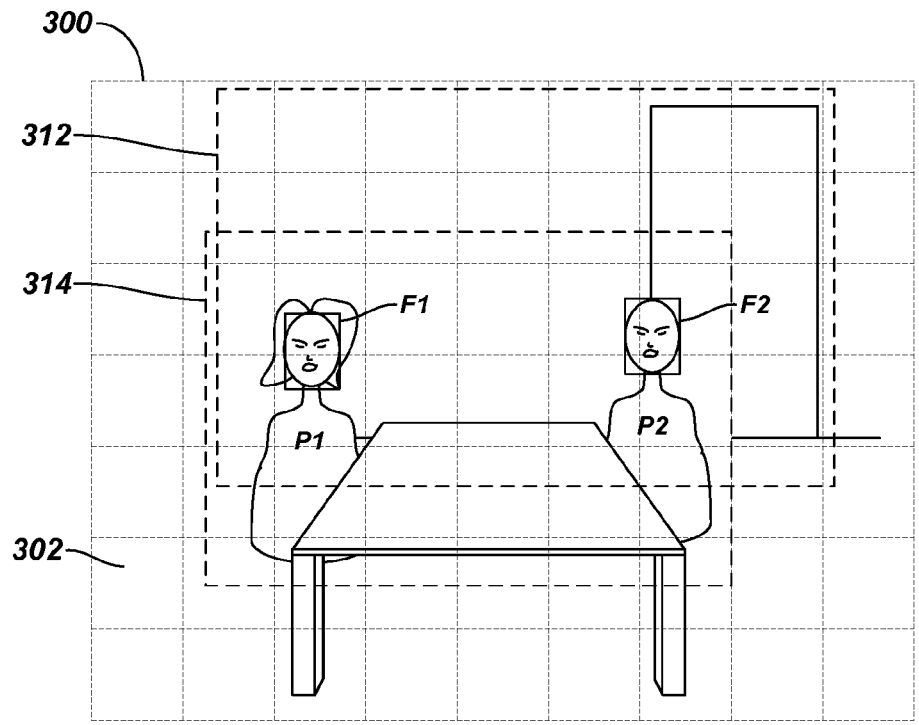

Eventually, after the new participant P2 enters and stops moving as shown in FIG. 6C, the main camera 150 may settle on a framed view 314 of both participants P1 and P2, selecting an appropriate width of the view to accommodate the two participant's faces F1 and F2 and an appropriate level to keep the faces F1 and F2 close to the vertical centerline of the view.

As part of the process for adjusting the framed view of the main camera 150, the endpoint 100 may use captured audio of the environment in configuring the adjustments to the view of the main camera 150. To do this as noted above, the endpoint 100 can determine bearing angles of locations of speech audio sources in the environment. The determined bearing angles of the source locations can then be coordinated with face locations detected in the environment so the coordinated information can be used in adjusting the view of the main camera 150. The endpoint 100 may even adjust the view of the main camera 150 to only capture the face of a participant who is speaking at some point during the conference.

The timing involved in detecting a visual change in the stationary view 300 and/or detecting speech audio in the environment and then making the adjustments to the main camera 150 can be predetermined or may vary. Preferably, the adjustments provide for smooth visual effects and account for appropriate processing. Accordingly, the framing and tracking rules of the module 220 can be flexible for various situations.

For example, when one of the participants (e.g., P1) talks, the framing and tracking rules of the module 220 may be configured to direct the main camera 150 at that participant P1 as the current talker. Before actually directing the camera 150, however, the framing and tracking module 220 can include a transitional mode that delays this action. Instead, the framing and tracking module 220 keeps the main camera 150 in its current view capturing all of the participants P1 and P2 while the participant P1 talks. If this participant P1 continues speaking for a certain period of time, the rules of the module 220 can then direct the main camera 150 to zoom in on that participant P1 as the current talker.

Figure 6D:
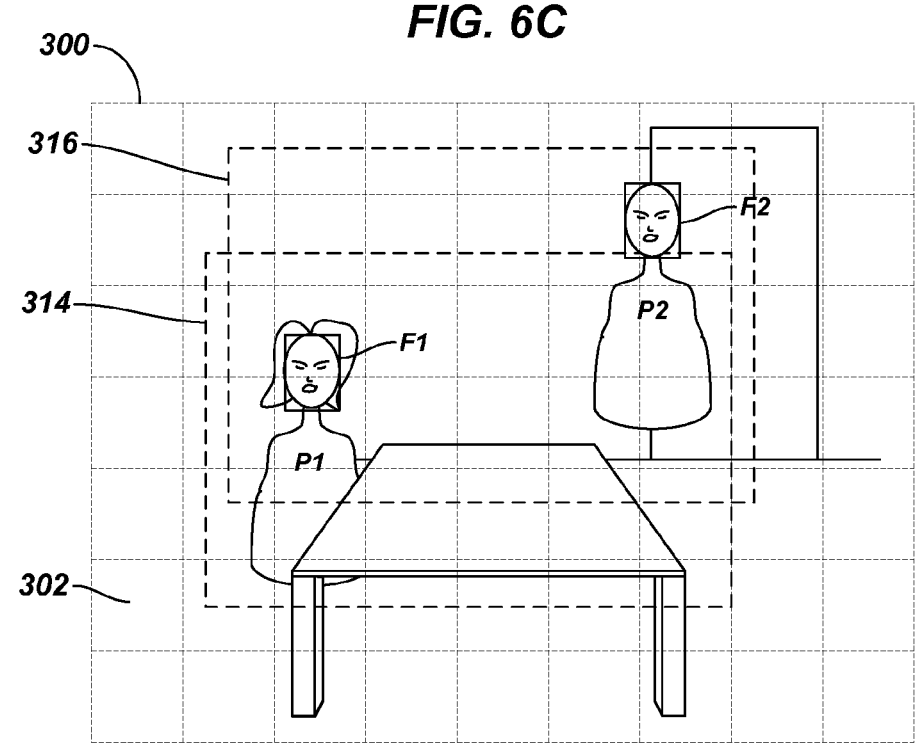

At some point as shown in FIG. 6D, one of the participants P2 may start moving such that the participant's face F2 leaves the main camera's framed view 314 or moves out of a designated boundary. Again, the adjunct camera 180 still captures images of the environment in the wide view 300, and the information is used to determine a new framed view 316 in FIG. 6D for the main camera 150 according to the steps previously discussed.

As will be appreciated, the framing of the participants P1 and P2 can account for a number of such changes as described above, including inclusion of one or more additional participants other than the participants P1 and P2 already present. Likewise, the framing can account for either of the participants P1 and P2 leaving the environment so that the endpoint 100 no longer detects that participant. As these scenarios show, using the adjunct camera 180 in the endpoint 100 can improve the automated framing of the participants in the videoconference.

Moreover, even if a participant P1 or P2 turns away from the cameras 150 and 180, the face detection performed by the endpoint 100 may be capable of detecting faces at three-quarter views or other profiles depending on the robustness of the algorithm. Additionally, even if a participant's face is no longer detected or recognized, the endpoint 100 may not immediately determine that the participant is no longer present in the environment. This makes sense because the participant may turn his head way, bend down, turn to a drawing board, etc. Therefore, the processing of the endpoint 100 preferably accounts for such intermittent changes as part of its framing and tracking rules in the module (220: FIG. 4).

To do this, the endpoint 100 can require certain time intervals to transpire to delay implementing changes in the automatic framing of the environment. Additionally, the endpoint 100 can accompany the face detection of a participant's face with motion detection, audio source location, skin recognition, and the like as disclosed herein so that the location of a participant is tied to several pieces of information. Should face detection during a processing interval fail to detect the face of an existing participant who has already been detected, the endpoint 100 can use this additional information to keep track of that participant. These and other rules can be used by the endpoint 100 to control the endpoint's operation and are described in more detail below.

In addition to framing each face of participants in the environment, the endpoint 100 can be put into a tracking mode to track and frame a single presenter. In this presenter tracking mode, the main camera 150 with the aid of the adjunct camera 180 can continuously track a single presenter as that person moves around the room. In this mode, the adjunct camera 180 captures the wide view of the environment, and face detection on the captured wide view (optionally in conjunction with motion detection, skin detection, audio source location, etc.) determines a current framed view of the main camera 150 to frame the moving participant. When the presenter moves out of a designated boundary or out of the framed view of the main camera 150, the adjunct camera 180 can still track the presenter and can be used to find a new location in the environment for the main camera 150 to frame. Timing of the new framing can be configured for a smooth video capture experience.

D. Motion Detection Used in Auto-Framing

With an understanding of the endpoint 100 and the process of automatic framing of participants in a videoconference environment, discussion now turns to further features of the present disclosure that enhance the auto-framing achieved. As can be appreciated, the detection results from the face detector 202 of FIG. 4 may not always be reliable when performing the auto-framing. For example, the face detector 202 can have false alarms or misses when the results are false positives and false negatives. For this reason, the endpoint 100 may use audio information to help frame the participants in the environment. However, as hinted to above, the endpoint 100 uses motion information from a motion detector 204 to accompany the face detection results when determining the auto-framing of the environment with the framing and tracking rules of the module 220.

1. Facial Region Used in Motion Detection

Figure 7:
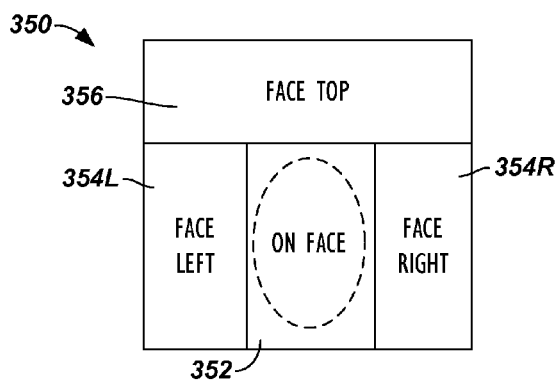
FIG. 7 diagrammatically illustrates an area or region associated with a face used during the processing of the disclosed endpoint.

To augment the face detection with motion detection, the endpoint 100 focuses on motion within a certain area associated with a detected face. For example, FIG. 7 diagrammatically shows an area or region 350 associated with a face (denoted by dashed outline). The area 350 is divided into regions or sections of interest where the endpoint (100) calculates motion. Preferably as shown, at least four sections are defined in the area 350 of the detected face. These sections include an On-Face section 352, a Face-Left section 354L, a Face-Right section 354R, and a Face-Top section 356.

The size and shape of these sections 352, 354, and 356 can de different than shown in FIG. 7 and can be adjusted for a given implementation. In general, the On-Face section 352 encompasses the location of a detected face, while the Face-Right and Face-Left sections 354R-L encompass areas to the right and left of the face location. Finally, the Face-Top section 356 encompasses an area above these sections and above the head of the participant's face.

The size of the area 350 depends on the size of the detected face. Therefore, a detected face of a participant further away in the stationary view of the adjunct camera 180 will have a smaller area 350 defined around it compared to the area 350 for a detected face of a closer participant. Furthermore, the FaceTop, FaceLeft, and FaceRight sections are preferably not contiguous to the OnFace section. Instead, some visual space may exist between the FaceTop and OnFace sections, the FaceLeft and OnFace sections, and the FaceRight and OnFace sections. These visual spaces can account for any normal movement of the participant's head in and around the OnFace section.

For completeness, a lower section below the On-Face section 352 can be recognized as an additional region for detecting motion, but this lower section may be less effective because a person's body typically fills this region anyway and would not provide useful motion information.

2. Motion Detection Process used in Auto-Framing

As noted above, motion detection (particularly in the area 350 of interest of a face as in FIG. 7) is used to enhance the auto-framing achieved according to the present disclosure. To that end, discussion turns now to FIG. 8, which shows a motion detection process 400 in flow chart form used in the auto-framing of the present disclosure. To facilitate discussion, reference numerals from previous figures are used throughout the description of the process 400.

A first procedure 401A (left side of FIG. 8) of the process 400 is directed to improving the detection results of the face detector 202 to reduce false positives and false negatives. In short, this procedure 401A determines when a potential face detected by the face detector 202 is a reliable face or not so the process 400 can filter out unreliable faces from the face detection conducted by the endpoint 100.

In this procedure, for each frame of video captured by the adjunct camera 180 (or at least some subset of frames on an ongoing basis) (Block 402), the process loops through each face detected by the face detector 202 (Block 404). As noted above, the position and size of each face is recorded in memory (and more particularly each face can be individually characterized depending on the face detection capabilities). For each face, the process 400 calculates motion pixels present in the face area and saves this information into a history buffer for later comparison (Block 406). Proceeding further, the process 340 calculates the statistics of the motion pixels in the four sections of the face area (350: FIG. 7) in a time period (e.g., 2 seconds) based on the history buffer (Block 408). From these statistics, the process 400 determines whether face-concentrated motion occurs or not (Decision 410).

For example, in the past 2 seconds or some other time period, the process 400 determines whether motion is detected in the On-Face section (352) (i.e., TotalMotionPixels_OnFace>0) and determines whether there is no motion in surrounding sections (354L-R and 356) (i.e., TotalMotionPixels_FaceTop=0, TotalMotionPixels_FaceLeft=0, and TotalMotionPixesl_FaceRight=0). This would mean that detected motion is associated with the location of the detected face and would constitute "face-concentrated motion."

Other determinations can be used. For example, an "uptime" parameter may be provided by the face detector 202. This "uptime" parameter indicates how long the face has been detected and may be given in terms of time or frames. Usually, the longer the uptime parameter is for a detected face, the more reliable that face is. Thus, processing can determine whether the "up time" parameter is greater than a first threshold (i.e., UpTime>THR1). Still other determinations can include whether a confidence score is greater than a second threshold (i.e., Confidence Score>THR2) and whether the detected face has been detected in the same position for a given amount of time that exceeds some third threshold (i.e., FaceInSamePositionTime>THR3).

A combination of these and other assessments at different levels of importance or weighting may be used to determine whether face-concentrated motion has occurred in the location of a detected face or not. If so, then the process declares the detected face at the location as a reliable face and saves an indication to that effect in a reliable face pool (Block 412).

For example, the face detection process may detect a face at a location in the video frame captured by the adjunct camera

180. Then, the motion detection of the process 400 may show that the On-face section 352 has face-concentrated motion associated with it because the person is talking, changing facial expressions, turning their head, blinking, etc. This would make the detected face a reliable face worthy of keeping framed by the adjustable camera 150 of the endpoint 100.

If face-concentrated motion is not determined (no at decision 410), then the process 400 determines whether the detected face corresponds to a face with the same identification (e.g., position, size, characteristic, etc.) was declared reliable before (Decision 416). If not, then the process 400 moves on to the next face (Block 404). For example, the face detector 202 may have detected a purported new face that lacks face-concentrated motion associated with it. If there was not a previous face at this location determined reliable, then the process 400 may consider the face detection as a false positive and disregard the detection as the process 400 then goes on to the next detected face.

If the detected face (lacking face-concentrated motion) is the same face as previously declared reliable (yes at decision 416), then the process 400 can again declare the detected face as a reliable face and save an indication to that effect in the reliable face pool (Block 414). For example, a face may have been detected, identified, and declared reliable previously in a past frame, yet the motion detector 204 may for whatever reason not detect face-concentrated motion in the current frame at the same location because the person has remained still or the motion detector 204 did not pick up the motion due to sensitivity. In this instance, the process 400 still declares the detected face as reliable, attempting to avoid excluding a reliable face from the auto-framing of the adjustable camera just because no motion is currently detected in the frame.

Branching off of the faces declared reliable in the reliable face pool (Block 414), the process 400 includes an additional procedure 401B (on the right side of FIG. 8) that uses motion information to help deal with situations when a participant moves his face away from the adjunct camera 180—even to the point of having his face not captured by the camera 180. In general, if there is no motion detected in the sections, i.e., Face-Left, Face-Right, and Face-Top, surrounding the participant's face, the participant should still be at the location. The procedure 401B discussed below helps make that determination so the participant can still be framed by the auto-framing of the adjustable camera 150.

Taking the reliable faces in the pool for the present frame and comparing them to the previous frame, the process 400 discovers each face declared reliable in the prior frame but for which the face detector 202 has not detected the face in the current frame. Taking these particular currently undetected, but previously reliable faces, the process 400 loops through each of the faces to determine if the person associated with that face is still there or not (Block 418). To do this, the process calculates the statistics of the motion pixels in the surrounding sections 354L-R and 356 of the face area 350 in the time period since the face was detected reliably in a previous frame (Block 420). Using these calculated statistics, the process 400 determines whether peripheral motion has occurred around the face (Decision 422). For example, the process 400 determines whether the participant has walked away, changed seats, left the room, etc.

In particular, the process 400 determines whether motion is detected in the sections surrounding the face (i.e., whether TotalMotionPixels_FaceTop==0, TotalMotionPixels_FaceLeft==0, and TotalMotionPixesl_FaceRight==0). If motion is detected in these peripheral sections (yes at decision 422), then the process 400 can determine that the participant is moving from that previous face location. In other words, if the person has walked away, then peripheral motion would be detected in one or more of the Face-Left, the Face-Right, and the Face-Top sections 354L-R and 356, as the person moves in either right or left directions relative to the camera (180) and potentially stands up.

If peripheral motion is detected (yes at decision 422), then the process 400 essentially determines that the person has moved and loops through to the next previously reliable face (Block 418). If there is no peripheral motion (no at decision 422), then the process 400 saves the face in the reliable face pool (Block 412) and goes on to the next currently undetected, but previously reliable face if there is one (Block 418).

Figure 9A:
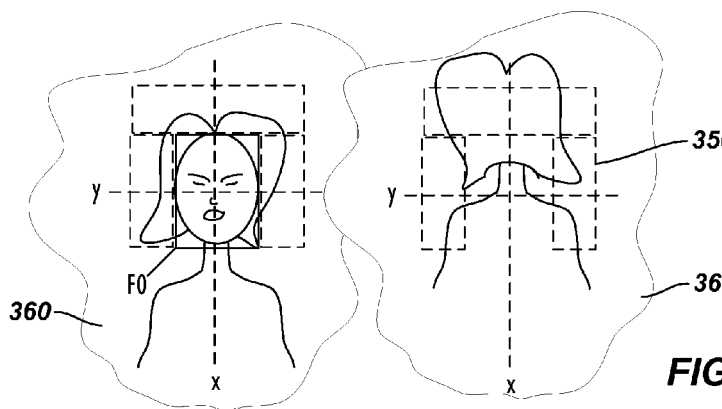
FIGS. 9A-9B illustrate portions of prior and current frames during the face detection and motion detection processing of FIG. 8.

To illustrate an example, FIG. 9A shows portion of a previous frame 360 relative to portion of a current frame 362 of video captured by the adjunct camera (180). A face (F0) was detected in the previous frame 360 along with its associated position (x, y), size, characteristic, etc. However, a face is not detected in the current frame 362 for the corresponding position (x, y). As shown, this is so because the participant has actually stood up and potentially turned away from the camera (180) capturing the frames 360 and 362. In this case, the process 400 of FIG. 8 detects motion in the surrounding sections of the area 350 and determines that there is no reliable face present.

Figure 9B:
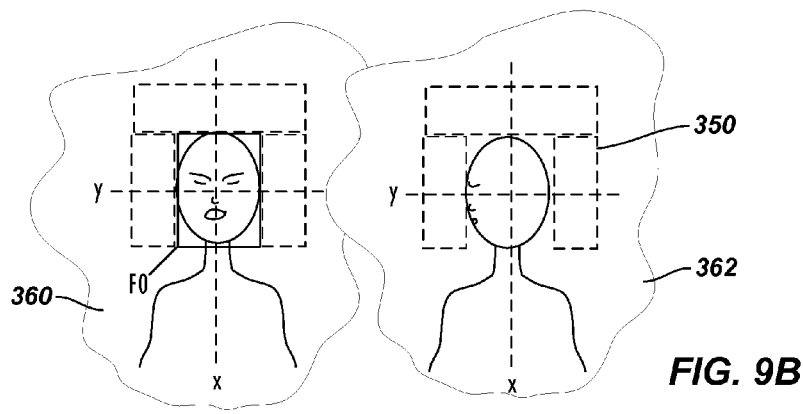

By contrast, FIG. 9B shows portion of a previous frame 360 relative to portion of a current frame 362. A face (F0) was detected in the previous frame 360 along with its associated position (x, y), size, characteristic, etc. However, a face is not detected in the current frame 362 for the corresponding position (x, y). As shown, this is so because the participant has turned his head away from the camera (180) capturing the frames 360 and 362. In this case, the process 400 of FIG. 8 does not detect motion (at least to some threshold) in the surrounding sections of the area 350 and determines that there is still a reliable face present. Accordingly, this participant can still remain framed in the auto-framing by the adjustable camera (150).

In the auto-framing, the motion detection as noted above is used in an unconventional manner. Conventional motion detection detects the presence of a participant in the field of view by purposely detecting motion of that participant. Although this procedure may be useful, the disclosed endpoint 100 uses motion detection to detect an absence of motion, and this determination is used to verify the presence of a participant in the field of view at a previously reliable location.

Figure 8:
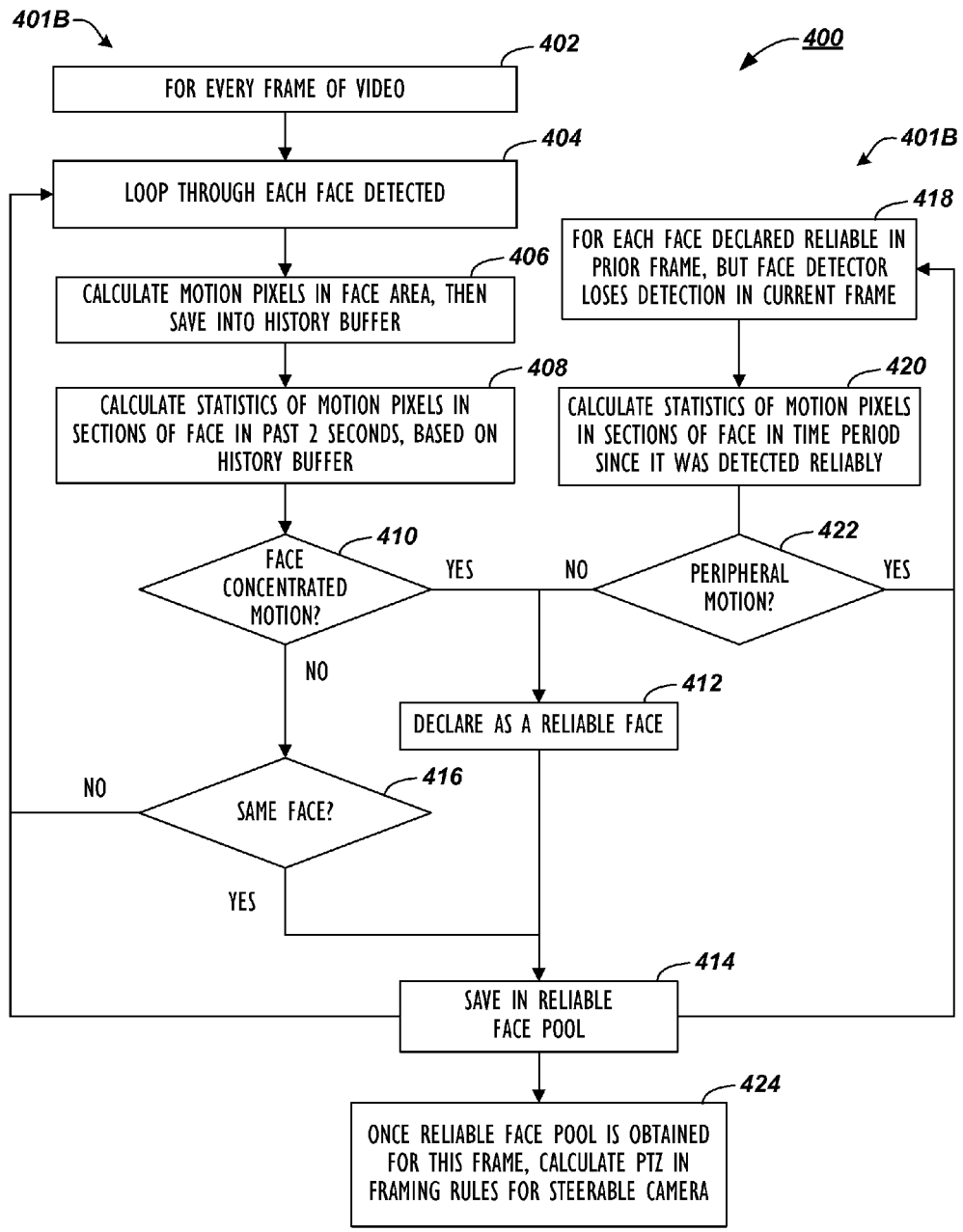
FIG. 8 illustrates a process in flow chart form for using motion detection in conjunction with face detection to enhance the auto-framing of the disclosed system.

Ultimately, the motion detection process 400 in FIG. 8 obtains a pool of reliable faces for the present frame (Block 414). As noted above, a reliable face determined by the process 400 is: (1) a face that has been detected by the face detector 202 in the current frame and has face-concentrated motion associated with it, (2) a face that has been detected by the face detector 202 in the current frame, does not have face-concentrated motion associated with it, but has been declared reliable in a prior frame, or (3) a face that has not been detected by the face detector 202 in the current frame, has been detected and deemed reliable in a prior frame, and does not have peripheral motion around it indicating the person has moved. Using this pool of reliable faces determined from the wide-angle view of the adjunct camera (180), the process 400 calculate pan, tilt, and/or zoom parameters according to the framing and tracking rules so the steerable camera (150) can be directed to frame all of the reliable faces in the current or subsequent frame (Block 424).

3. Block Motion Detection to Handle Camera Vibration

Figure 10:
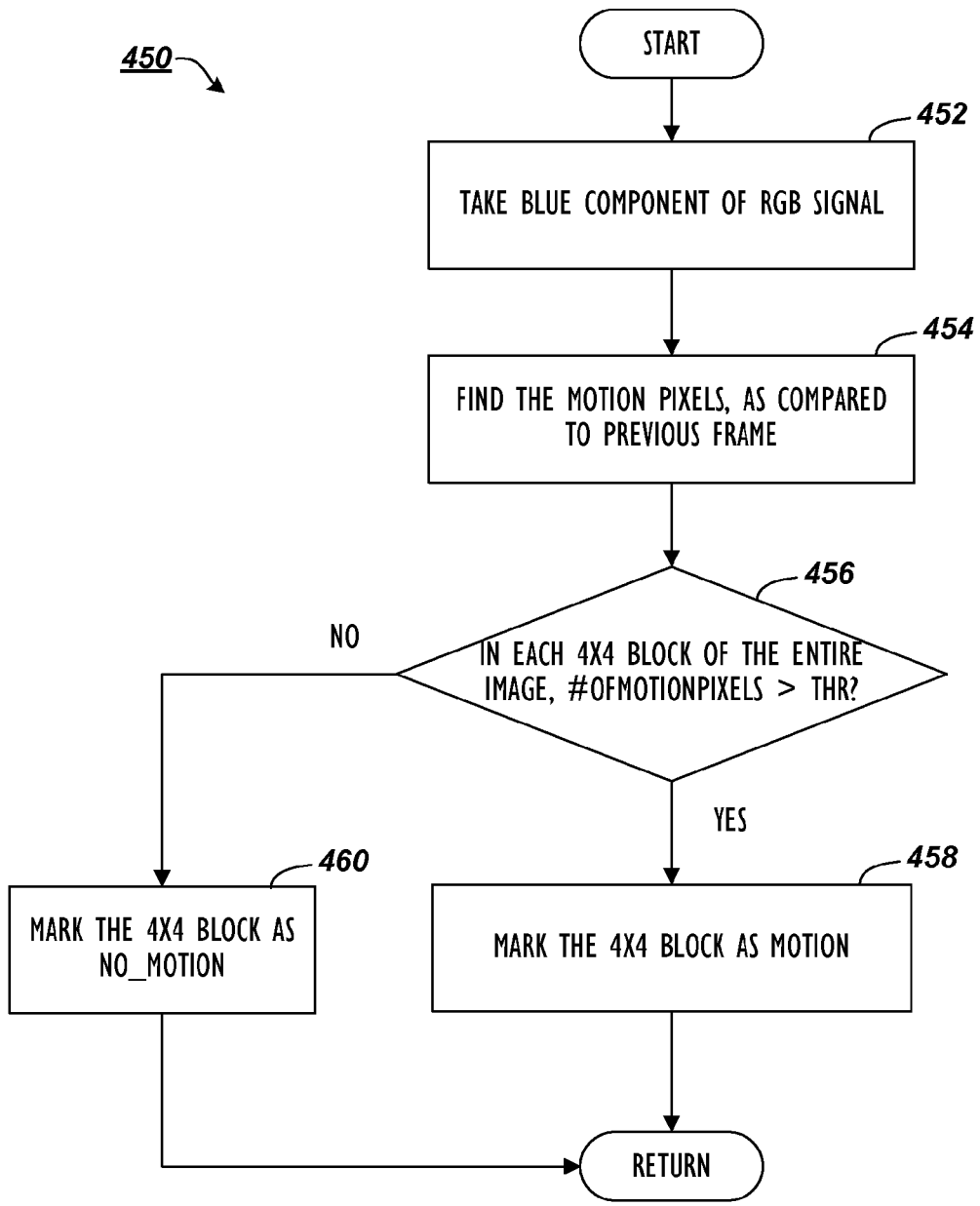
FIG. 10 illustrates a motion detection process based on blocks for dealing with vibration of the camera during processing.

As will be appreciated, a camera may be subject to vibration caused by movement in the building, cooling fans associated with equipment, movement of the structures on which the camera is mounted, etc. This can be especially true of the adjunct camera 180 of the present disclosure when a web camera or the like. To deal with such small camera vibration and avoid falsely detecting motion in the captured frames of the camera 180 caused by vibration, the motion detector (e.g., 204: FIG. 4) uses block motion detection as shown in FIG. 10.

In the block motion detection, a process 450 takes the blue component of the RGB signal of a frame from the adjunct camera 180 (Block 452) and performs a comparison of the blue component with a previous frame to find the motion pixels (i.e., those pixels of the current frame with a component value different from the previous frame) (Block 454). The difference of the component values for pixels between the frames is indicative of a change (i.e., motion) occurring between the frames and may depend on a threshold.

Rather than taking this information as indicative of motion, the process 450 instead focuses on blocks of pixels, such as blocks having 4×4 pixels. For example, in each 4×4 block of the entire image, the process 450 determines whether the number of motion pixels is greater than a threshold (i.e., NumberofMotionPixels>THR) (Block 456). If the threshold is exceeded for the given block, then the process 450 marks that particular block as containing motion (Block 458). Otherwise, the process 450 marks that particular block as not containing motion (Block 460). In the end, the overall indication of the blocks is returned in the motion detection process 450 so that the motion detection is less susceptible to vibration of the camera.

Various changes in the details of the illustrated operational methods are possible without departing from the scope of the following claims. For instance, illustrative flow chart steps or process steps may perform the identified steps in an order different from that disclosed here. Alternatively, some embodiments may combine the activities described herein as being separate steps. Similarly, one or more of the described steps may be omitted, depending upon the specific operational environment in which the method is being implemented.

In addition, acts in accordance with flow chart or process steps may be performed by a programmable control device executing instructions organized into one or more program modules on a non-transitory programmable storage device. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Non-transitory programmable storage devices, sometimes called a computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A videoconferencing method, comprising:
    capturing first video in a first view of an environment with a first camera;
    detecting one or more faces of participants in the first video;
    verifying at least one of the one or more detected faces as being reliable;
    determining a boundary in the first view of the environment containing the at least one verified face;
    adjusting a second view of a second camera to a framed view of the environment based on the determined boundary; and
    capturing second video in the framed view with the second camera.

2. The method of claim 1, wherein the steps of capturing, detecting, verifying, determining, and adjusting are performed repeatedly for frames of the first video.

3. The method of claim 1, wherein capturing the first video in the first view of the environment with the first camera comprises operating a web camera as the first camera.

4. The method of claim 1, wherein the act of verifying comprises analyzing an area of the first video associated with each of the one or more detected faces for motion and indicating the at least one of the one or more detected faces as being reliable based on the analysis.

5. The method of claim 4, wherein the act of analyzing comprises, for a subject face of the one or more detected faces:
    detecting a presence of motion in an on-face region of the area associated with the subject face; and
    indicating the subject face as reliable based on the detected motion.

6. The method of claim 4, wherein the act of analyzing comprises, for a subject face of the one or more detected faces:
    detecting an absence of motion in an on-face region of the area associated with the subject face;
    determining that the subject face has been indicated as previously reliable; and
    indicating the subject face as currently reliable based on the previous indication.

7. The method of claim 1, wherein detecting the one or more faces of participants in the first video comprises determining that a subject face of the one or more detected faces has been previously detected in the first video and has not been currently detected in the first video.

8. The method of claim 7, wherein the act of verifying comprises, for the subject face:
    detecting an absence of motion in a region surrounding the subject face; and
    indicating the subject face as being reliable based on the absence of detected motion.

9. The method of claim 8, wherein the act of verifying comprises disregarding the subject face as reliable by detecting a presence of motion in a region surrounding the subject face.

10. The method of claim 1, wherein detecting the one or more faces of the participants in the first video comprises detecting for a presence of motion in the first video.

11. The method of claim 10, wherein detecting for the presence of motion in the first video comprises:
    detecting for any motion pixels indicative of motion in the first video by comparing first and second frames of the first video;
    determining, for each block of multiple pixels in the first video, whether the detected motion pixels in the each block exceeds a threshold; and
    indicating each block determined to exceed the threshold as having the presence of motion.

12. The method of claim 11, wherein detecting for any motion pixels indicative of motion in the first video comprises analyzing a blue component of the pixels in the first video.

13. The method of claim 1, wherein determining the boundary in the first view of the environment containing the at least one verified face comprises:
    starting with an initial boundary in the first view;
    determining that the initial boundary contains less than all of the at least one verified face in the first view; and
    determining a subsequent boundary by adjusting the initial boundary to contain all of the at least one verified face in the first view.

14. The method of claim 1, wherein detecting the one or more faces of participants in the first video and determining the boundary in the first view of the environment containing the at least one verified face comprises repeatedly:
    storing one or more current face locations of the one or more faces currently detected in the first view;
    detecting one or more new face locations of any one or more verified faces newly detected in the first view;
    detecting a difference between the one or more current face locations and the one or more new face locations; and
    adjusting the boundary in the first view based on the detected difference.

15. The method of claim 1, wherein adjusting the second view of the second camera to the framed view of the environment based on the determined boundary comprises controlling one or more of a pan, a tilt, and a zoom of the second camera.

16. The method of claim 1, further comprising:
    capturing audio of the environment; and
    using the captured audio in adjusting the second view of the second camera.

17. The method of claim 16, wherein using the captured audio in adjusting the second view of the second camera comprises:
    determining from the captured audio one or more bearing angles of one or more source locations in the environment;
    coordinating the one or more bearing angles of the one or more source locations with one or more face locations of the one or more detected faces in the environment; and
    using the coordinated one or more bearing angles in adjusting the second view of the second camera.

18. A program storage device having program instructions stored thereon for causing a programmable control device to perform a method according to claim 1.

19. A videoconferencing apparatus, comprising:
    a first camera capturing first video in a first view of an environment;
    a second camera capturing second video in a second view of the environment; and
    processing circuitry operatively coupled to the first and second cameras, the processing circuitry configured to:
        detect one or more faces of participants in the first video,
        verify at least one of the one or more detected faces as being reliable,
        determine a boundary in the first view of the environment containing the at least one verified face, and
        adjust the second view of the second camera to a framed view of the environment based on the determined boundary.

20. The apparatus of claim 19, wherein the first camera comprises a web camera, and wherein the second camera comprises a pan-tilt-zoom camera.

21. The apparatus of claim 20, wherein a video device comprises the first camera, the second camera, and the processing circuitry associated therewith.

22. The apparatus of claim 21, further comprising a videoconferencing unit separate from the video device and being operatively coupled thereto.

23. The apparatus of claim 21, wherein to verify at least one of the one or more detected faces as being reliable, the processing circuitry is configured to analyze an area of the first video associated with each of the one or more detected faces for motion.

24. The apparatus of claim 22, further comprising at least two microphones capturing audio in the environment, and wherein the processing circuitry is programmed to:
    determine from the captured audio one or more bearing angles of one or more source locations in the environment;
    coordinate the one or more bearing angles of the one or more source locations with one or more face locations of the one or more detected faces in the environment; and
    use the coordinated one or more bearing angles in adjusting the second view of the second camera.

* * * * *